(12) United States Patent
Einzig et al.

(10) Patent No.: US 9,699,645 B2
(45) Date of Patent: Jul. 4, 2017

(54) METHOD AND SYSTEM FOR USING A SUPERVISORY DEVICE WITH A MOBILE DEVICE

(71) Applicant: Kid Case L.L.C., Parsippany, NJ (US)

(72) Inventors: David Einzig, Livingston, NJ (US); Gerald Durand, Los Gatos, CA (US)

(73) Assignee: Kid Case, Inc., Parsippany, NJ (US)

( * ) Notice: Subject to any disclaimer, the term of this patent is extended or adjusted under 35 U.S.C. 154(b) by 82 days.

(21) Appl. No.: 14/449,826

(22) Filed: Aug. 1, 2014

(65) Prior Publication Data
US 2015/0038133 A1 Feb. 5, 2015

Related U.S. Application Data

(60) Provisional application No. 61/861,850, filed on Aug. 2, 2013, provisional application No. 61/936,662, filed on Feb. 6, 2014.

(51) Int. Cl.
*H04M 11/00* (2006.01)
*H04W 8/22* (2009.01)
*H04M 1/725* (2006.01)

(52) U.S. Cl.
CPC ............ *H04W 8/22* (2013.01); *H04M 1/7253* (2013.01); *H04M 1/72527* (2013.01); *H04M 1/72577* (2013.01)

(58) Field of Classification Search
None
See application file for complete search history.

(56) References Cited

U.S. PATENT DOCUMENTS

| 4,032,983 A | 6/1977 | Sato | |
|---|---|---|---|
| 5,938,767 A | * 8/1999 | Horn | H04L 63/10 710/108 |

(Continued)

FOREIGN PATENT DOCUMENTS

| FR | 2976497 | 6/2011 |
|---|---|---|
| IL | 140624 | 10/2003 |

OTHER PUBLICATIONS

Bigben Interactive, Parental Control: Protective casing integrating parental controls for the Nintendo 3DS console, http://www.bigben-interactive.co.uk/produit/id/4516, printed Aug. 1, 2014, 5 pages.

*Primary Examiner* — Moustapha Diaby
(74) *Attorney, Agent, or Firm* — McDonnell Boehnen Hulbert & Berghoff LLP

(57) ABSTRACT

A method and system are provided for monitoring and controlling a mobile device using a supervisory device. In some embodiments, the supervisory device operates in conjunction with the mobile device to monitor an extent of usage of the mobile device as well as to ensure that certain software is being used appropriately. The supervisory device may take one or more responsive actions when an extent of usage of the mobile device reaches a threshold extent of usage, when certain software on the mobile device is not being used appropriately, and/or when certain settings of the mobile device have been changed. The supervisory device may operate in a non-permissible mode and determine that the mobile device is currently enabled. In response to this operation and determination, the supervisory device may disable the mobile device and/or transmit to an external device a notification message.

20 Claims, 5 Drawing Sheets

(56) References Cited

U.S. PATENT DOCUMENTS

| | | | |
|---|---|---|---|
| 6,442,106 B1* | 8/2002 | Newby | G04G 15/00 340/309.7 |
| 2003/0107470 A1 | 6/2003 | Kady | |
| 2003/0168472 A1* | 9/2003 | Segiet | B67D 1/0029 222/129.1 |
| 2004/0051733 A1 | 3/2004 | Katzir | |
| 2004/0064540 A1* | 4/2004 | Yanagi | H04L 41/0253 709/223 |
| 2004/0136522 A1* | 7/2004 | Wurtz | H04M 1/6058 379/430 |
| 2005/0015612 A1 | 1/2005 | You et al. | |
| 2006/0047980 A1 | 3/2006 | Price et al. | |
| 2006/0229108 A1 | 10/2006 | Cehelnik | |
| 2007/0266447 A1 | 11/2007 | Hollander | |
| 2008/0141293 A1 | 6/2008 | Blanchard et al. | |
| 2008/0320577 A1 | 12/2008 | Larduinat | |
| 2009/0015372 A1 | 1/2009 | Kady | |
| 2009/0064302 A1 | 3/2009 | Colella | |
| 2010/0321289 A1 | 12/2010 | Kim et al. | |
| 2011/0150234 A1 | 6/2011 | Johnson et al. | |
| 2011/0151830 A1 | 6/2011 | Blanda et al. | |
| 2011/0193539 A1* | 8/2011 | Schmidt | H02M 3/156 323/282 |
| 2011/0195665 A1 | 8/2011 | Friedlaender | |
| 2012/0327615 A1* | 12/2012 | Waters | G06F 1/1628 361/752 |
| 2013/0040604 A1 | 2/2013 | Sprigg et al. | |

\* cited by examiner ns the mobile device is currently enabled. In response to the supervisory device operating in the non-permissible mode and the supervisory device determining that the mobile device is currently enabled, the supervisory device may disable the mobile device.

In one embodiment of the system disclosed herein, a supervisory device may include a timer module, a user interface, a button-pressing mechanism, and a computing device coupled to the timer module, user interface, and the button-pressing mechanism. The computing device may be configured to carry out supervisory functions that include receiving via the user interface an indication of a desired operating time of the mobile device, programming the timer module with the desired operating time, decrementing the timer module when the mobile device is in use, and causing the button-pressing mechanism to depress a button on the mobile device when the mobile device is in use and the timer module is fully decremented.

These as well as other aspects, advantages, and alternatives will become apparent to those of ordinary skill in the art by reading the following detailed description with reference where appropriate to the accompanying drawings. Further, it should be understood that the description in this overview section and elsewhere in this document is not intended to be limiting but is merely provided to illustrate the concept by way of example.

METHOD AND SYSTEM FOR USING A SUPERVISORY DEVICE WITH A MOBILE DEVICE

CROSS-REFERENCE TO RELATED APPLICATIONS

The present application is a non-provisional application claiming priority to U.S. provisional application No. 61/861,850 filed on Aug. 2, 2013 and U.S. provisional application No. 61/936,662 filed on Feb. 6, 2014, the entire contents of each of which are incorporated by reference herein.

BACKGROUND

The ubiquity of mobile computing devices, such as tablet computers, cellular telephones, portable music players, and others, seems to be increasing every day. What is more, the functionality of these mobile devices continue to grow. Today, for instance, many mobile devices feature the ability to play games, take pictures, watch TV and movies, browse the Internet, as well as do many other things.

Given this wide array of features, these mobile devices can, at times, be distracting. For example, young children who like to interact with these mobile devices may be overwhelmed by their level of engagement while doing so. As a result, the children may desire use these mobile devices more often or in ways less appropriate than desired by their parents or caregivers. This overuse, may lead to a diminished participation in other activities that might lead to a more well-rounded upbringing.

It may be desirable for parents, caregivers, schools, universities, companies, municipalities, government agencies and/or other entities to monitor and control the usage of a particular mobile device (e.g., mobile phones, tablet computers, notebook computers, and/or any other type of computing device). It may also be desirable to control the days and/or times that the mobile device can be powered on and/or control what software can be used on the mobile device and at what times.

SUMMARY

To this end, disclosed herein are methods and systems for monitoring and controlling a mobile device using a supervisory device. In some embodiments, the supervisory device operates in conjunction with the mobile device to monitor an extent of usage of the mobile device. The supervisory device may be external to the mobile device and may be positioned within a protective case that surrounds the mobile device, for instance. The supervisory device may be communicatively coupled to the mobile device via a wired or wireless interface and may operate to communicate with software on the mobile device to measure an extent of usage of the mobile device. In accordance with some of the embodiments of the present disclosure, the supervisory device may take one or more responsive actions when an extent of usage of the mobile device reaches a threshold extent or an unauthorized change has been made to the mobile device's software. Accordingly, the supervisory device may be useful for parents (or other entities) who want to monitor and/or limit the time their children (or others) spend using the mobile device. The supervisory device may be useful in other circumstances as well.

More specifically, but still by way of example, in one embodiment of the disclosed method, a supervisory device may operate in a non-permissible mode and determine that

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Example Operation of a Supervisory Device

Figure 1:
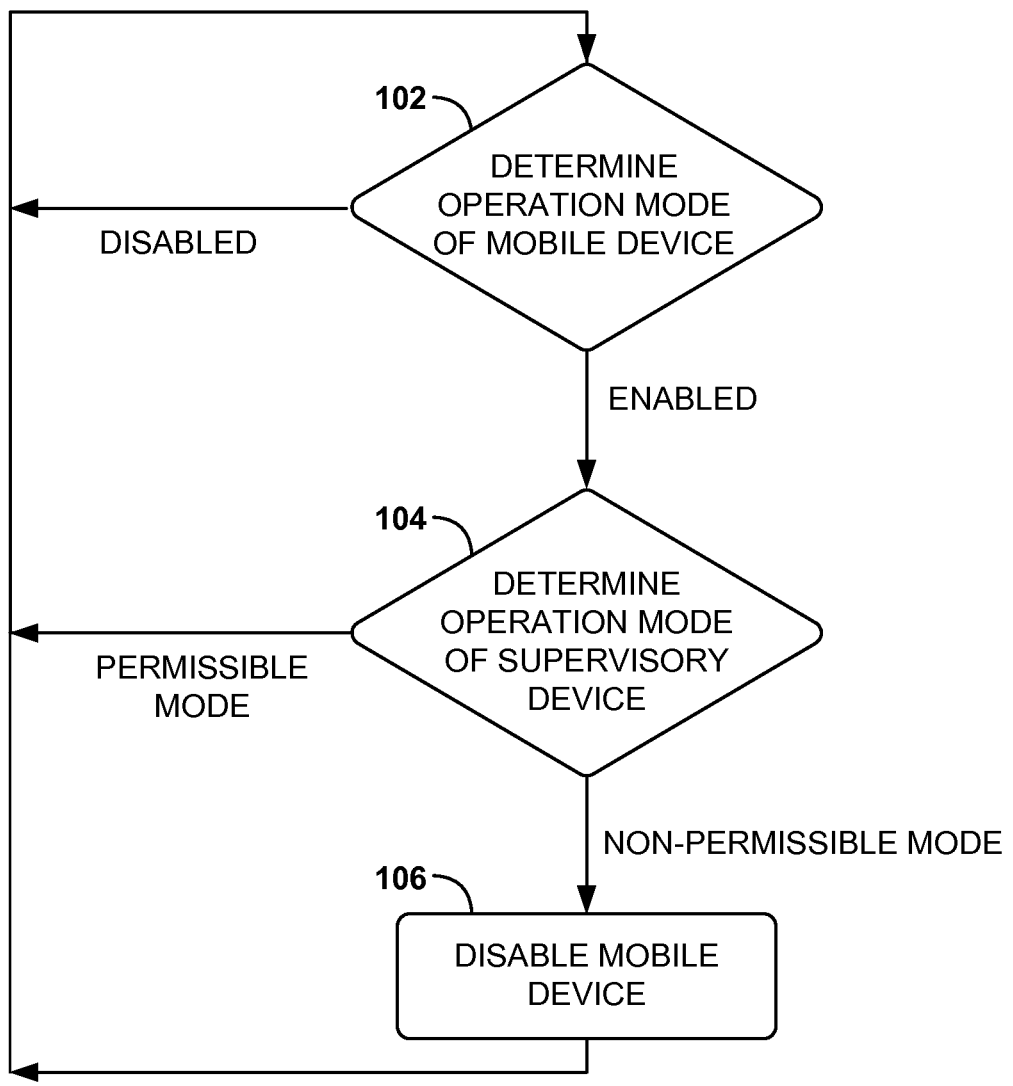
FIG. 1 is a flow chart depicting example operations that can be carried out in accordance with the present disclosure.

Referring to the drawings, FIG. 1 is a flowchart depicting an example process that may be carried out by a supervisory device, in accordance with an example embodiment of the present disclosure. As depicted, the flowchart of FIG. 1 includes several example operations, functions, or actions, as depicted by one or more of blocks 102, 104, and/or 106, each of which may be carried out by any of the systems described herein and by way of FIGS. 2-5; however, other configurations could be used as well.

Furthermore, those skilled in the art will understand that the flowchart set forth herein illustrates functionality and operation of certain implementations of example embodiments. In this regard, each block of the flowchart may represent a module, a segment, or a portion of program code, which includes one or more instructions executable by a processor for implementing specific logical functions or steps in the process. The program code may be stored on any type of computer readable medium, for example, such as a storage device including a disk or hard drive. In addition, each block may represent circuitry that is wired to perform the specific logical operations in the process. Alternative implementations are included within the scope of the example embodiments of the present application in which operations may be executed out of order from that shown or discussed, including substantially concurrent or in reverse order, depending on the functionality involved, as would be understood by those reasonably skilled in the art.

As depicted in FIG. 1, the flowchart begins at block 102 where the supervisory device determines the operation mode of the mobile device. In one embodiment, the supervisory device determines whether the mobile device is enabled, that is, whether the mobile device is in use; or whether the mobile device is disabled, that is, whether the mobile device is not in use. In accordance with this embodiment, when the supervisory device determines that the mobile device is enabled, flow proceeds to block 104. However, when the supervisory device determines that the mobile device is disabled, flow proceeds back to block 102.

In order to determine whether the mobile device is enabled the supervisory device may receive a signal from the mobile device that indicates whether or not the mobile device is awake and/or in use. For instance, some mobile devices may include one or more interface ports that couple to various propriety or non-proprietary cables. In some examples, depending on the type of mobile device, these ports may take the form of a micro USB port, a mini USB port, a LIGHTNING or 30-pin serial data port (such as those that may be found on mobile devices produced by Apple Inc. in Cupertino, Calif.), as well as other types of interface ports. Supplied via these interface ports may be various signal lines that indicate various operating states of the mobile device. In some implementations, one of these signal lines carries a signal that indicates whether the mobile device is in an awake mode or a sleep mode. Accordingly, in this implementation, the supervisory device includes a cable, or built-in docking plug, that couples to this interface port. And in order to determine the operating mode of the when the mobile device (as well as perhaps whether software is operating as intended) the supervisory device may detect the presence (or absence) of the particular signal at the interface port.

According to another implementation, a signal that indicates the operation mode of the mobile device takes the form of a particular wireless signal transmitted by the mobile device to the supervisory device. For instance, supervisory software may be installed on the mobile device that is configured to cause the mobile device to emit a detectable wireless signal indicative of whether the mobile device is currently in use. The supervisory device may be appropriately configured to detect the wireless signal such that when determining the operation mode of the mobile device, the supervisory device operates to detect the presence (or absence) of the particular wireless signal. By way of example, the signal may be transmitted and received via a BLUETOOTH or a Wi-Fi interface; however, other wireless protocols may be used as well.

According to still another implementation, a signal that indicates the operation mode of the mobile device takes the form of a particular voltage measured at the mobile device's headphone/microphone jack. For instance, some mobile devices, particularly tablet computers and mobile telephones, but other mobile device as well, may include a jack that accepts a ⅛ inch or 3.5 millimeter diameter, three-conductor headphone/microphone plug. Mobile devices may also include a mechanical switch (or other mechanism) that detects when a headphone/microphone plug is inserted into the jack. In response to detecting that a headphone/microphone plug is inserted into the jack, a mobile device may disable any built-in speakers as well as supply a voltage to a particular portion of the jack in order to operate a microphone that is coupled to the headphone/microphone plug. The voltage supplied to the microphone portion of the jack may vary based on whether the mobile device is currently in use. For instance, in one example, the voltage supplied to the microphone portion of the jack when the mobile device is currently in use (e.g., when the mobile device is in an awake mode) is 5V, whereas the voltage supplied to the to the microphone portion of the jack when the mobile device is not currently in use (e.g., when the mobile device is in a sleep mode) is 0.5V. However, other voltages are possible in other examples.

Accordingly, in this implementation, the supervisory device may include a cable that plugs into the mobile device's headphone/microphone jack. Thus, when determining the operation mode of the mobile device, the supervisory device may measure the voltage supplied to the plug by the mobile device and determine that the mobile device is currently enabled when the measured voltage is at or near 5.0V, and determine that the mobile device is currently disabled when the measured voltage is at or near 0.5V.

In still other implementations, the supervisory device may determine the operation mode of the mobile device based on one or more sensors integrated in or otherwise accessible to the supervisory device. In one example, the supervisory device may be embedded within or otherwise comprise a protective case for the mobile device. The protective case may include a cover that contains one or more sensors that serve to indicate whether or not the cover is closed over the mobile device. The cover being closed over the mobile device may indicate that the mobile device is not in use, whereas the cover not being closed over the mobile device may indicate that the mobile device is in use.

Depending on the implementation, one of the sensors may be a magnetic sensor that receives a magnetic signal when the cover is closed over the mobile device. Additionally or alternatively, one of the sensors may be a light sensor that detects the absence of light when the cover is closed over the mobile device. Additionally or alternatively, one of the sensors may include a proximity sensor that detects the proximity of the cover to the face of the mobile device when the cover is closed over the mobile device. Other sensors are possible. And other ways to determine whether the mobile device is currently in use are possible as well.

As mentioned above, when the supervisory device determines that the mobile device is enabled, flow continues to block 104 where the supervisory device determines the operation mode of the supervisory device. In one embodiment, the supervisory device determines whether the supervisory device is in a permissible mode, in which it is permitted that the mobile device be used; or whether the supervisory device is in a non-permissible mode, in which it is not permitted that the mobile device be used. In accordance with this embodiment, when the supervisory device determines that the supervisory device is in a permissible mode, flow proceeds back to block 102. However, when the supervisory device determines that the supervisory device is in a non-permissible mode, flow continues to block 106.

In one embodiment, the supervisory device may determine the operation mode of the supervisory device by referring to a programmable timing unit. For instance, in one implementation, the supervisory device is operable to program a timing unit with a desired usage allotment (e.g., four hours). Accordingly, after programming the timing unit with an allotment of, say, four hours, the supervisory device may decrement the timing unit when the supervisory device determines that the mobile device is enabled. Thus, in this implementation, the supervisory device may determine the operation mode of the supervisory device by referring to the timing unit and determining whether any time remains on the timing unit. More specifically, when time remains on the programmable timing unit, the supervisory device may determine that the supervisory device is in the permissible mode, whereas when no time remains on the programmable timing unit, the supervisory device may determine that the supervisory device is in the non-permissible mode.

In another implementation, the supervisory device operates the timing unit as a traditional timer and increments the timer, starting from zero, when the supervisory device determines that the mobile device is enabled. Thus, in this implementation, the supervisory device may determine the operation mode of the supervisory device by referring to the timing unit and determining whether the elapsed time on the timing unit has reached a threshold amount of time (e.g., four hours). More specifically, when the timing unit has not reached the threshold amount of time, the supervisory device may determine that the supervisory device is in the permissible mode, whereas when the timing unit has reached or exceeded the threshold amount of time, the supervisory device may determine that the supervisory device is in the non-permissible mode.

In yet another implementation, the supervisory device is operable to program the programmable timing unit with certain forbidden time periods of the day during which it is desired that the mobile device not be used (e.g., after 10:00 PM and before 8:00 AM). Thus, in this implementation, the supervisory device may determine the operation mode of the supervisory device by referring to a traditional clock and determining whether the current time falls within one of the forbidden time periods. More specifically, when the current time does not fall within one of the forbidden time periods, the supervisory device may determine that the supervisory device is in the permissible mode, whereas when the current time does fall within one of the forbidden time periods, the supervisory device may determine that the supervisory device is in the non-permissible mode. Other mechanisms are possible for keeping track of the extent of usage of a mobile device as well.

In some embodiments, the supervisory device may determine that the supervisory device is in the permissible mode despite the fact that no time may remain on the programmable timing unit, the timing unit may have reached or exceeded a threshold amount of time, or the current time may fall within one of the forbidden time periods, as the case may be. In one example of this, the supervisory device may determine whether a pre-approved application is running on the mobile device, and if so, determine that the supervisory device is in the permissible mode without referring to the programmable timing unit. In order to carry out such a determination, a parent (or other administrator of the supervisory device) may program the supervisory device with a list of pre-approved applications (such applications may be applications the parent or administrator determines to be of an educational nature; however, non-educational applications be designated as pre-approved applications as well). In operation, the supervisory device may receive a signal from the mobile device via a wired interface (e.g., a micro USB port, a mini USB port, a LIGHTNING or 30-pin serial data port) or a wireless interface (e.g., utilizing a BLUETOOTH or Wi-Fi communication protocol) indicating to the supervisory device the name and/or type of application currently running on the mobile device. The supervisory device may refer to the list of pre-approved applications and determine that the supervisory device is in the permissible mode when the application currently running matches one of the pre-approved applications on the list.

In addition to determining that the supervisory device is in the permissible mode when a pre-approved application is currently running on the mobile device, the supervisory device may also pause the timing unit or otherwise not keep track of the usage of the mobile device so long as the pre-approved application is currently running on the mobile device. In this way, when a child (or other user of the mobile device) uses a pre-approved application, such use may not count towards the usage allotment. Other ways to determine that the supervisory device is in the permissible mode are possible as well.

In a contrasting way, the supervisory device may determine that the supervisory device is in the non-permissible mode despite the fact that some time may remain on the programmable timing unit, the timing unit may not yet have reached or exceeded a threshold amount of time, or the current time may not fall within one of the forbidden time periods, as the case may be. In one example of this, the supervisory device may determine whether a disapproved application is running on the mobile device, and if so, determine that the supervisory device is in the non-permissible mode without referring to the programmable timing unit. In order to carry out such a determination, a parent (or other administrator of the supervisory device) may program the supervisory device with a list of disapproved applications. In operation as described above, in the supervisory device may receive a signal from the mobile device via a wired interface (e.g., a micro USB port, a mini USB port, a LIGHTNING or 30-pin serial data port) or a wireless interface (e.g., utilizing a BLUETOOTH or Wi-Fi communication protocol) indicating to the supervisory device the name and/or type of application currently running on the mobile device. The supervisory device may refer to the list of disapproved applications and determine that the supervisory device is in the non-permissible mode when the application currently running matches one of the disapproved applications on the list.

In another example, the supervisory device may determine that the supervisory device is in the non-permissible mode when an unauthorized change has been made to the settings of the mobile device or to certain software installed on the mobile device. In order to carry out such a determination, the supervisory device may be pre-programmed to identify particular changes to a software and its settings, or a parent (or other administrator of the supervisory device) may program the supervisory device with a list of mobile device settings that should be "bodyguarded" (such as a system unlock password, a new application installation password, etc.) and/or a list of applications that should not be uninstalled or otherwise changed. In operation, the supervisory device may periodically poll the mobile device (e.g., via any of the wired or wireless interfaces described above) to determine whether any of the bodyguarded settings have been changed or whether any listed application has been uninstalled or otherwise had a settings change. When the supervisory device determines that a bodyguarded setting or a listed application has been changed, the supervisory device may determine that the supervisory device is in the non-permissible mode without also referring to the timing unit. Other ways to determine that the supervisory device is in the non-permissible mode are possible as well.

As mentioned above, when the supervisory device determines that the supervisory device is in the non-permissible mode, flow continues to block 106 where the supervisory device disables the mobile device and, perhaps, carries out one or more additional responsive actions. In one embodiment, disabling the mobile device includes powering down the mobile device, preventing the mobile device from being turned on, putting the mobile device in a sleep or other low-power mode, turning off the mobile device's screen, or otherwise interfering with the ability to effectively view and/or interact with the mobile device. In one implementation of this, the supervisory device may disable the mobile device by sending a signal, either wired via a micro USB port, mini USB port, a LIGHTNING or 30-pin serial data port, as well as other types of interface ports, to software on the mobile device initiating an action that will disable the device. Such a signal may also be sent wirelessly to the mobile device via BLUETOOTH, Wi-Fi, or other wireless communication protocol.

In embodiments in which the supervisory device is embedded within (or otherwise comprises) a protective case for the mobile device, the protective case may include a mechanism that operates to mechanically depress a power button on the mobile device. For instance, this mechanism may take the form of a lever and gear arrangement powered by an electric motor with a lead screw or other gearing/pulley arrangement (such as the type commonly used in automobile door locks), a pull or push type solenoid, actuator, a NITINOL spring or other long wire pulling device, a wax motor, or any other type of device. Thus, in these embodiments, the supervisory device may disable the mobile device by actuating this mechanism.

In embodiments in which the supervisory device is embedded within (or otherwise comprises) a protective case for the mobile device, an additional or alternative way to disable the mobile device may include manipulating a screen of the protective case so that the protective case's screen interferes with the ability to effectively view and/or interact with the mobile device. In one example of this, the protective case's screen may include a type of electrically-switchable smart glass, such as Electric Frosted Glass, whereby an application of electric current to the protective case's screen may change the opacity of the protective case's screen or otherwise interfere with the visibility of the mobile device. Other ways to manipulate a screen and other ways to disable a mobile device are possible as well.

Although not shown in the flowchart of FIG. 1, the supervisory device may take one or more additional or alternative actions in response to determining that the supervisory device is in the non-permissible mode and the mobile device is enabled. One of these responsive actions is to actuate some audible or visual alarm, such as a buzzer, an LED, or both. Another responsive action is to cause the mobile device to display via its user interface some customized alert message. Still another responsive action is to transmit a message (e.g., an email message, an SMS message, or some other type of message) to an external device (e.g., a parent's cell phone, tablet, and/or desktop computer) that indicates that there has been a threshold extent of usage of the mobile device, and/or that there has been an unauthorized settings change to the mobile device itself or to a certain application installed on the mobile device. The supervisory device may itself transmit the message or the supervisory device may cause the mobile device to transmit the message.

In an alternative implementation, rather than disabling the mobile device at block 106, the supervisory device may instead just keep track of the usage of mobile device. For instance, the supervisory device may increment a timer when the supervisory determines that the mobile device is currently in use. The supervisory device may display the contents of timer via a user interface on the supervisory device and/or periodically transmit the contents of the timer to the mobile device or an external device (e.g., a parent's cell phone, tablet, and/or desktop computer).

In order to facilitate the aforementioned operations, the supervisory device may include a user interface that enables a user to input a desired operating time limit of the mobile device, specify the forbidden time periods, and/or set or change other ancillary settings of the supervisory device. The user interface may include an LCD touch-screen display, keyboard, a keypad, a computer mouse, a track ball, a joystick, and/or other similar devices, now known or later developed. In one embodiment, the user interface may be accessed within an application downloaded to the mobile device and/or a separate mobile device, such as a parent's cell phone or tablet, for example. To help prevent the unauthorized changing of certain supervisory settings (e.g., the desired operating time of the mobile device), the user interface may be secured with a password or other locking mechanism. Accordingly, before the desired operating time, or other settings may be changed, a user may be required to enter the correct password via the user interface.

Additionally, settings of the supervisory device, such as the desired operating time limit, or particular applications or software that are permitted to be used, may be changed without the use of the supervisory device's user interface. For instance, the supervisory device may be communicatively coupled in some way with the mobile device, and as such, the mobile device may be operable to input a settings change to the supervisory device. Alternatively, the supervisory device and/or the mobile device may be operable to communicate over a wired or wireless interface with one or more external devices (e.g., a parent's cell phone or corporate IT department), and as such, the one or more external devices may be operable to input a settings change to the supervisory device. By way of example, the wireless interface may be a BLUETOOTH or Wi-Fi interface, although others are possible.

As indicated, in some embodiments, the supervisory device may be embedded within (or otherwise comprise) a protective case for the mobile device. As such, the protective case may lock onto the mobile device to help prevent the removal of the supervisory device. Accordingly, in one implementation, the protective case may include one or more ramp-type latches (such as the type commonly used to latch doors in a house). When the protective case is closed, a spring-loaded latch may engage and lock the case closed, perhaps producing an audible "click." To open the protective case, a motive force may retract the latch springs or rotate/slide them out of contact with the protective case's cover. Other designs may include more latches, or even other locking mechanisms altogether.

In addition to the features and functionality described above, the supervisory device may also include one or more of an external power interface to couple to an external power source and charge the supervisory device's (and possibly also the mobile device's) battery; a user interface and external display in order to facilitate the programming of the supervisory device and display of a remaining permissible operating time of the mobile device; external speakers and/or a microphone for outputting and inputting sound, respectively; shielding material to block the emission of potentially harmful extremely low frequency (ELF) and radio frequency (RF) electromagnetic radiation (EMR); and a kickstand that enables upright positioning of the mobile device on a flat surface.

2. Example Supervisory Device Architecture

Figure 2:
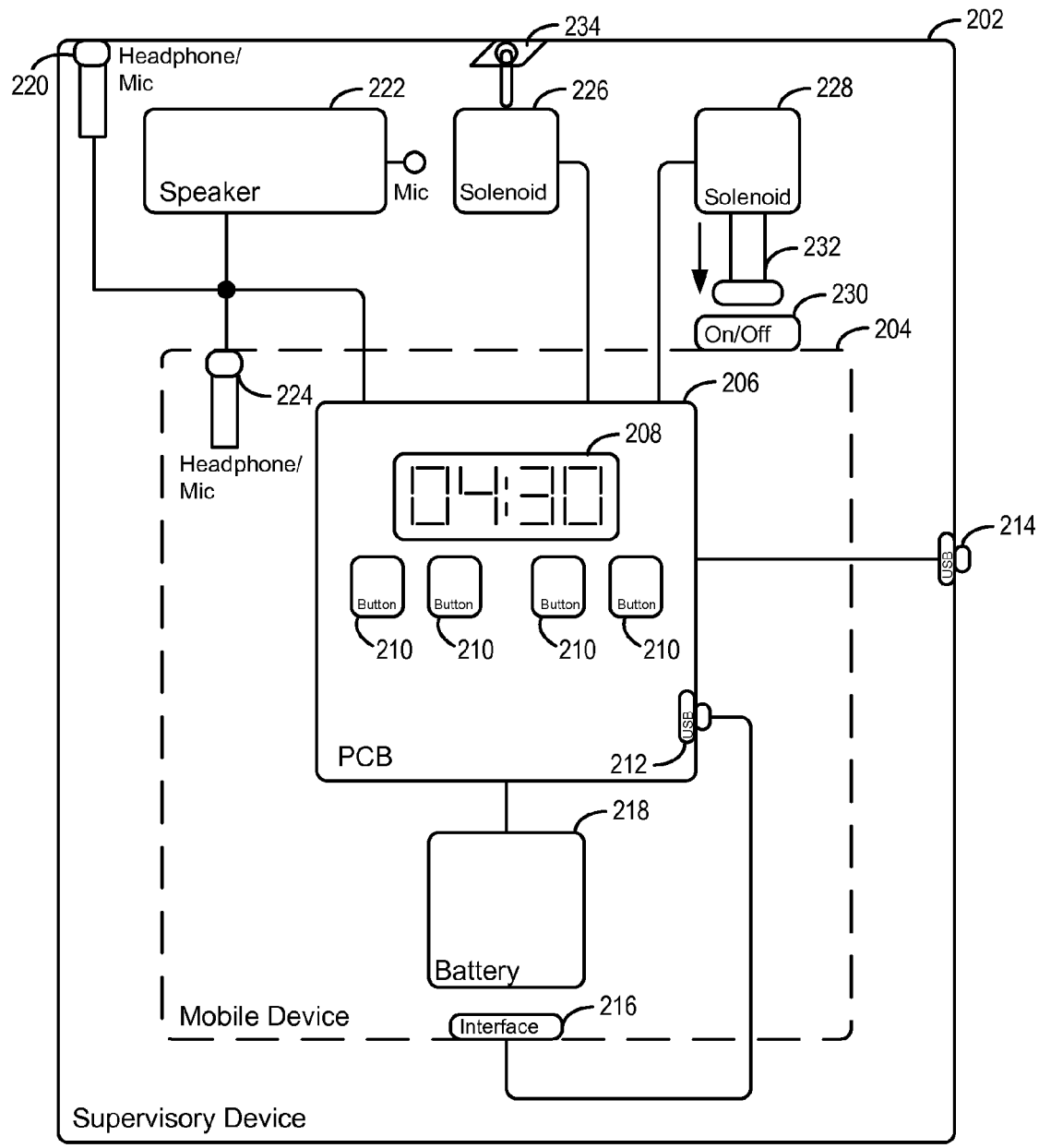
FIG. 2 is a simplified block diagram of a supervisory device and a mobile device arranged to operate in accordance with the present disclosure.
Figure 5:
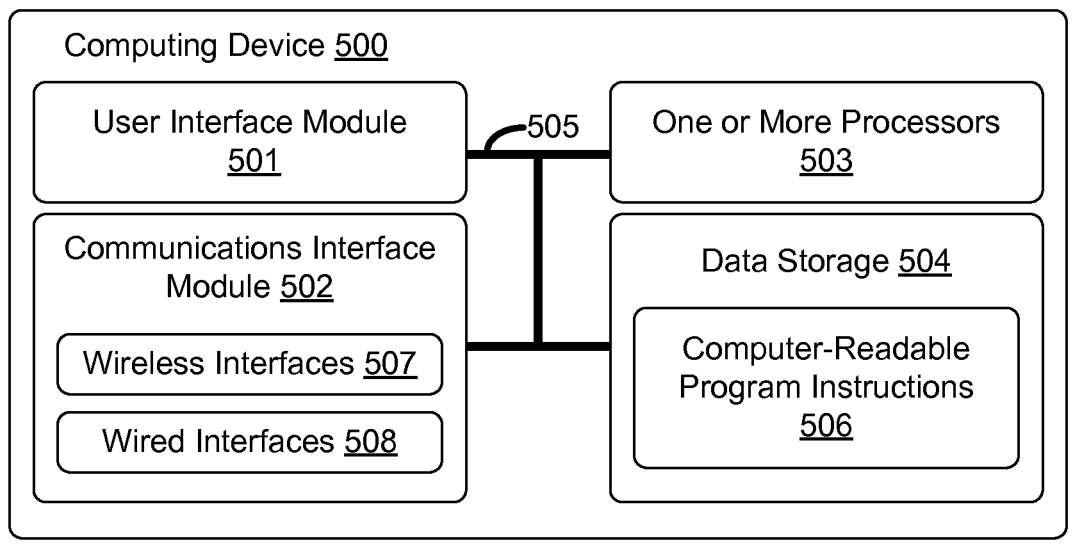
FIG. 5 is a simplified block diagram of an example computing device arranged to operate in accordance with the present disclosure.

FIG. 2 is a block diagram that depicts an example arrangement of a supervisory device 202 and a mobile device 204. In particular, FIG. 1 may depict a rear view of the mobile device 204 and the supervisory device 202, in which the supervisory device 202 comprises a protective case for the mobile device 204. As depicted, the supervisory device 202 includes a printed circuit board (PCB) 206 that includes LCD display 208, which may function to display an amount of remaining permitted operating time, buttons 210, and one or more computing devices (FIG. 5). In one implementation, buttons 210 are used to set a new permissible operating time or otherwise interact with the supervisory device 202 and the PCB 206, in particular. However, other user input devices, such as a touch screen, are possible as well.

Additionally, the PCB 206 may include a USB interface 212 and a USB interface 214. USB interface 214 may be configured to couple to an external device (such as a laptop or a parent's cell phone) or an external power source. Via the USB interface 214, power may be supplied to PCB 206 and to recharge battery 218. Additionally, power supplied by USB 214 may be routed to the mobile device 204 via USB interface 212 and interface 216. In this manner, the mobile device 204 may receive power and/or recharge its battery when the supervisory device is coupled to the external power source. The PCB 206 may include program logic that monitors the current draw of the mobile device in order to determine whether it is recharging the battery or whether the battery is fully charged. Such program logic may operate to allow the supervisory device's battery 218 to charge only after the mobile device's battery is fully charged. Other implementations are possible as well.

Furthermore, in some implementations, the coupling between USB interface 212 and interface 216 is also a communicative coupling. In such implementations, the PCB 206 may be operable to receive signals from the mobile device 204 that are indicative of various operating states of the mobile device 204.

Also included with supervisory device 202 is a headphone/microphone jack 220 that is communicatively coupled to PCB 206, headphone/microphone jack 224 of mobile device 204, and a speaker/microphone unit 222 of supervisory device 202. As described above, supervisory device 202 may also include a solenoid 228 that is communicatively coupled to PCB 206. As a general matter, a solenoid is a device that has a metal shaft encased in an electrical coil. Upon application of power, the metal shaft is pulled to the center of the coil. Depending on which extensions are added to the shaft, the solenoid can be configured for either a pulling or a pushing operation.

For instance, in operation according to one implementation, the PCB 206 may actuate the solenoid 228 such that a moveable portion 232 depresses an on/off button of mobile device 204 in response to determining that the mobile device 204 is currently in use (e.g., via the headphone/microphone jack 224). However, other functions are possible as well. Supervisory device 202 may also include a second solenoid 226 which is configured to physically couple with a lock 234. In one implementation, the PCB 206 may actuate the solenoid 226 in order to release the lock 234 and allow the supervisory device 202 to be removed from the mobile device 204. However, other ways to lock supervisory device 202 to mobile device 204 are possible as well.

Figure 3:
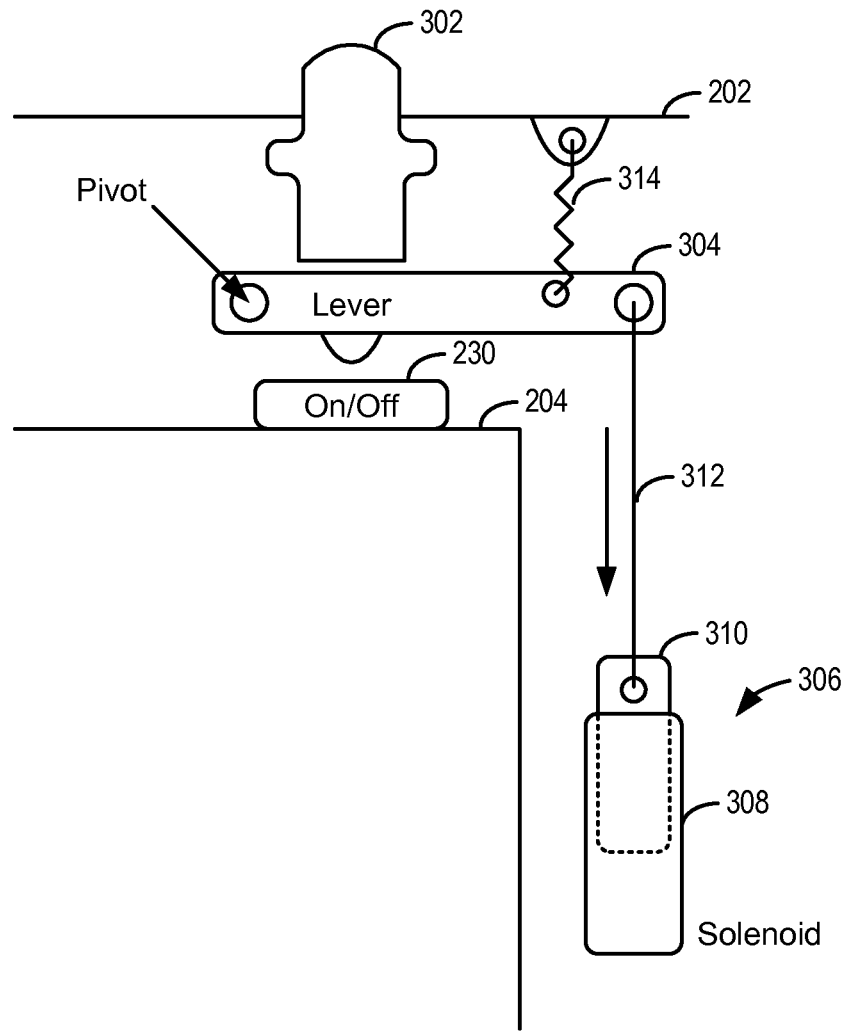
FIG. 3 is a simplified block diagram of a solenoid-button interface arranged to operate in accordance with the present disclosure.

FIG. 3 depicts an alternate implementation of the solenoid-button interface. As depicted, the top edge of the supervisory device 202 includes a button 302 that, when depressed, operates to compress a lever 304 and an on/off button 230 of mobile device 204 in order to turn on or off the mobile device 204. As an alternative and perhaps autonomous way to turn off mobile device 204, the supervisory device 202 may include a solenoid 306 and lever 304. As depicted, the solenoid 306 includes a body 308 and a movable portion 310. Coupled to the movable portion 310 is a cable 312, which is coupled to the level 304.

In operation, power is supplied to solenoid 306, which operates to force the movable portion 310 of solenoid 306 downward. In order to provide a short burst of high current and voltage to operate the solenoid, the PCB 206 may store a charge in a capacitor (not shown) and then release this charge suddenly into the solenoid. As the moveable portion 310 retracts downward, it pulls the right portion of the lever 304 via cable 312 and extends a spring 314. This downward motion operates to bring the lever 304 in contact with the on/off button 230 as the lever 304 pivots at its left-most point. After power is removed from the solenoid 306, the spring 314 may assist in returning the lever 304 and solenoid 306 to a resting position. The capacitor (not shown) may charge again after a short time period and enable an additional operation of the solenoid.

Figure 4:
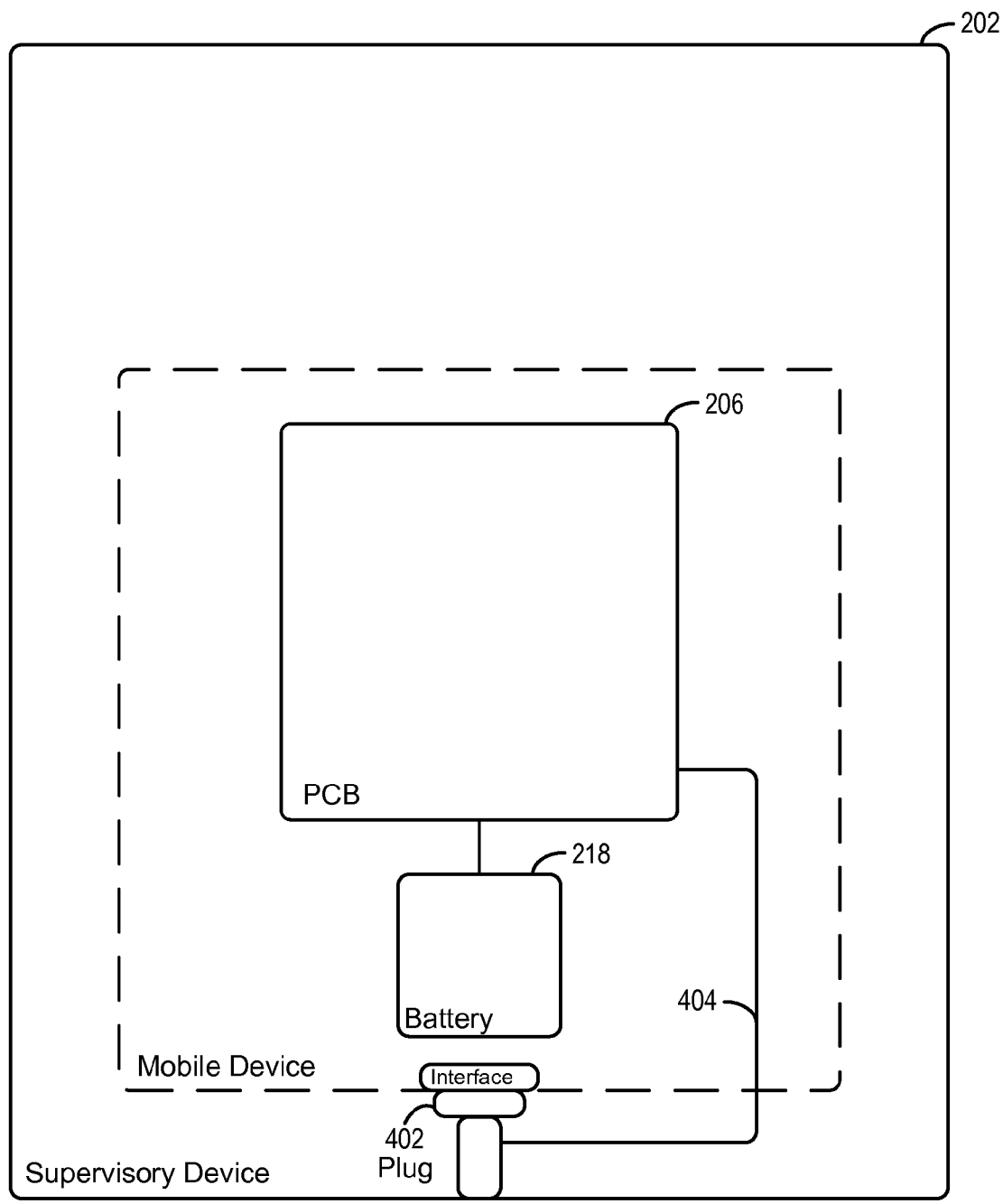
FIG. 4 is a simplified block diagram of a supervisory device and a mobile device arranged to operate in accordance with the present disclosure.

FIG. 4 depicts select portions of the supervisory device 202 and mobile device 204, in accordance with another implementation. In this implementation, the supervisory device 202 is in the form of a protective case and a dock for the mobile device 204. As depicted, the mobile device 204 may be inserted into the protective case of the supervisory device 202 and couple to a plug 402 of the supervisory device 202 via the interface port 216 of the mobile device 204. PCB 206 may be coupled to this plug 402 and thus mobile device 204 via one or more signal lines 404. As mentioned above, PCB 206 may receive via the interface port 216 various signals that are indicative of the operating state of the mobile device 204. PCB 206 may also operate to control various portions of software running on mobile device 204 via the interface port 216. In addition, PCB 206 may operate to provide power to mobile device 204 (and a battery (not shown) of mobile device 204) via the interface port 216 and plug 402.

FIG. 5 is a block diagram of a computing device 500 that may be included as a part of PCB 206, in accordance with one example implementation. The computing device 500 may include a user interface module 501, a communication interface module 502, one or more processors 503, and data storage 504, all of which can be linked together via a system bus, network, or other connection mechanism 505.

The user interface module 501 can be operable to send data to and/or receive data from external user input/output devices. For example, the user interface module 501 can be configured to send/receive data to/from user input devices such as a keyboard, a keypad, a touch screen, a computer mouse, a track ball, a joystick, and/or other similar devices, now known or later developed. The user interface module 501 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 501 can also be configured to generate audible output(s), such as a speaker, speaker jack, audio output port, audio output device, earphones, and/or other similar devices, now known or later developed.

The user interface module 501 may be used to enter data for use with the methods and systems disclosed herein. Thus, in one implementation, a user may manipulate portions of user interface module 501 in order to program the supervisory device with the desired operating time of the mobile device and/or certain time period in which it is desired that the mobile device not be used.

Additionally, the user interface module 501 may include some form of access prevention so that unauthorized users, such as children, are prevented from accessing the user interface and thereby perhaps modifying the desired operating time or adding new time once the desired operating time has elapsed. In some examples, the access prevention takes the form of a password or key code that is required in order to access the user interface; however, other forms of access prevention are possible.

The network-communications interface module 502 can include one or more wireless interfaces 506 and/or wired interfaces 508 that are configurable to communicate via a network. The wireless interfaces 506 can include one or more wireless transceivers, such as a Bluetooth transceiver, a Wi-Fi transceiver, or other wireless transceiver. The wired interfaces 508 can include one or more wired transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wired network.

The one or more processors 503 can include one or more general purpose processors and/or one or more special purpose processors (e.g., digital signal processors, application specific integrated circuits, etc.). The one or more processors 503 can be configured to execute computer-readable program instructions 506 that are contained in the data storage 504 and/or other instructions as described herein.

The data storage 504 can include one or more computer-readable storage media that can be read or accessed by at least one of the processors 503. The one or more computer-readable storage media can include volatile and/or non-volatile storage components, such as optical, magnetic, organic or other memory or disc storage, which can be integrated in whole or in part with at least one of the one or more processors 503. In some embodiments, the data storage 504 can be implemented using a single physical device (e.g., one optical, magnetic, organic or other memory or disc storage unit), while in other embodiments, the data storage 504 can be implemented using two or more physical devices.

Computer-readable storage media associated with data storage 504 and/or other computer-readable media described herein can also include non-transitory computer-readable media such as computer-readable media that stores data for short periods of time like register memory, processor cache, and random access memory (RAM). Computer-readable storage media associated with data storage 504 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 504 and/or other computer-readable media described herein can also be any other volatile or non-volatile storage systems. Computer-readable storage media associated with data storage 504 and/or other computer-readable media described herein can be considered computer readable storage media for example, or a tangible storage device.

The data storage 504 can include computer-readable program instructions 506 and perhaps additional data. In some embodiments, the data storage 504 can additionally include storage required to perform at least part of the herein-described techniques, methods, and/or at least part of the functionality of the herein-described devices and networks.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures. Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for controlling a mobile device via a supervisory device, the method comprising:
   the supervisory device operating in a non-permissible operation mode, wherein the supervisory device is configured to operate in either a permissible operation mode or the non-permissible operation mode, and wherein the supervisory device comprises a case that substantially surrounds the mobile device;
   the supervisory device determining that the mobile device is currently enabled; and
   in response to the supervisory device operating in the non-permissible mode and the supervisory device determining that the mobile device is currently enabled, the supervisory device mechanically engaging the mobile device via the case so as to disable the mobile device.

2. The method of claim 1, wherein the supervisory device maintains a countdown timer, the method further comprising:
   the supervisory device operating in the permissible mode when the timer has remaining time; and
   the supervisory device operating in the non-permissible mode when the timer has no remaining time.

3. The method of claim 2, wherein the case comprises a cover with at least one sensor embedded therein that is configured to determine when the cover is closed upon the mobile device, the method further comprising:
   the supervisory device determining via the at least one sensor that the cover is closed upon the mobile device; and
   in response to the supervisory device determining that the cover is closed upon the mobile device, the supervisory device pausing the countdown timer.

4. The method of claim 3, wherein the at least one sensor comprises one more sensors selected from the group consisting of: a magnetic sensor, a light sensor, and a proximity sensor.

5. The method of claim 1, further comprising:
maintaining a timer that defines blocked periods in which it is desired that the mobile device not be used;
the supervisory device operating in the permissible mode when the timer indicates that it is not in a blocked period; and
the supervisory device operating in the non-permissible mode when the timer indicates that it is in a blocked period.

6. The method of claim 1, wherein the supervisory device determining that the mobile device is currently enabled comprises:
the supervisory device receiving from the mobile device a signal indicative of the mobile device being currently enabled.

7. The method of claim 1, wherein the supervisory device is electrically coupled to the mobile device via a headphone jack on the mobile device, and wherein the supervisory device determining that the mobile device is currently enabled comprises the supervisory device measuring a voltage at the headphone jack and determining that the measured voltage exceeds a threshold voltage level.

8. The method of claim 1,
wherein the mobile device comprises a button that, when depressed, operates to disable the mobile device,
wherein the case comprises a mechanism operable to depress the button, and
wherein the supervisory device mechanically engaging the mobile device via the case so as to disable the mobile device comprises the supervisory device operating the mechanism to depress the button.

9. The method of claim 8, wherein the mechanism is a solenoid.

10. The method of claim 1, wherein the case comprises a screen, and
wherein mechanically engaging the mobile device via the case so as to disable the mobile device comprises manipulating the screen such that viewing of the mobile device through the screen is inhibited.

11. A supervisory device comprising:
a case adapted to substantially surround a mobile device; and
one or more computing devices coupled to the case, the one or more computing devices being configured to carry out operations including;
operating in a non-permissible operation mode,
determining that the mobile device is currently enabled, and
in response to operating in the non-permissible mode and determining that the mobile device is currently enabled, mechanically engaging the mobile device via the case so as to disable the mobile device.

12. The supervisory device of claim 11, wherein the operations further include:
maintaining a countdown timer,
operating in a permissible mode when the timer has remaining time, and
operating in the non-permissible mode when the timer has no remaining time.

13. The supervisory device of claim 11, wherein the operations further include:
maintaining a timer that defines blocked periods in which it is desired that the mobile device not be used,
operating in a permissible mode when the timer indicates that it is not in a blocked period, and operating in the non-permissible mode when the timer indicates that it is in a blocked period.

14. The supervisory device of claim 11, wherein the case comprises a cover with at least one sensor embedded therein that is configured to determine when the cover is closed upon the mobile device, wherein the operations further include:
determining via the at least one sensor that the cover is closed upon the mobile device, and
in response to determining that the cover is closed upon the mobile device, pausing a countdown timer.

15. The supervisory device of claim 11, wherein the one or more computing devices are configured to be electrically coupled to the mobile device via a headphone jack on the mobile device, and wherein determining that the mobile device is currently enabled comprises measuring a voltage at the headphone jack and determining that the measured voltage exceeds a threshold voltage level.

16. The supervisory device of claim 11,
wherein the case comprises a mechanism operable to depress a button on a mobile device disposed within the case, and
wherein mechanically engaging the mobile device via the case so as to disable the mobile device comprises operating the mechanism to depress the button.

17. The supervisory device of claim 11, wherein the case comprises a screen, and
wherein mechanically engaging the mobile device via the case so as to disable the mobile device comprises manipulating the screen such that viewing of the mobile device through the screen is inhibited.

18. A non-transitory computer-readable medium (CRM) having program instructions stored thereon, which, when executed by a processor, causes the processor to carry out functions comprising:
operating in a non-permissible operation mode,
determining that a mobile device is currently enabled, and
in response to operating in the non-permissible mode and determining that the mobile device is currently enabled, mechanically engaging the mobile device via a case that substantially surrounds the mobile device so as to disable the mobile device.

19. The CRM of claim 18, wherein the functions further comprise:
maintaining a timer,
operating in a permissible mode when either (i) the timer has remaining time, or (i) when the timer indicates that it is not in a blocked period,
operating in the non-permissible mode when either (i) the timer has no remaining time, or (ii) when the timer indicates that it is in a blocked period.

20. The CRM of claim 18, wherein mechanically engaging the mobile device via the case so as to disable the mobile device comprises operating a mechanism within the case so as to depress a button on the mobile device.

* * * * *